United States Patent [19]
McGovern et al.

[11] Patent Number: 6,101,907
[45] Date of Patent: Aug. 15, 2000

[54] INTERFERENCE FIT JOINT AND METHOD AND INDEXABLE RATCHET WRENCH UTILIZING SAME

[75] Inventors: Bryan M. McGovern; Glenn A. Kaufman, both of Kenosha, Wis.

[73] Assignee: Snap-on Tools Company, Kenosha, Wis.

[21] Appl. No.: 09/200,679

[22] Filed: Nov. 25, 1998

[51] Int. Cl.[7] .................................................. B25B 23/16
[52] U.S. Cl. ........................................ 81/177.8; 403/359
[58] Field of Search ............................. 81/177.8; 403/52, 403/359

[56] References Cited

U.S. PATENT DOCUMENTS

| | | | |
|---|---|---|---|
| 2,921,773 | 1/1960 | Hoelzer | ................................ 81/177.8 |
| 3,577,795 | 5/1971 | Bennett . | |
| 3,621,945 | 11/1971 | Spry . | |
| 3,836,272 | 9/1974 | Duer . | |
| 4,178,777 | 12/1979 | Ying et al. . | |
| 4,210,372 | 7/1980 | McGee et al. . | |
| 4,406,186 | 9/1983 | Gummow . | |
| 4,838,832 | 6/1989 | Schmitt et al. . | |
| 4,989,708 | 2/1991 | Gaggermeier . | |
| 5,020,397 | 6/1991 | Minuto . | |
| 5,257,557 | 11/1993 | Battten . | |
| 5,295,423 | 3/1994 | Mikic . | |
| 5,419,221 | 5/1995 | Cole | ............................................. 81/60 |
| 5,503,494 | 4/1996 | Kamata et al. | ......................... 403/359 |
| 5,647,683 | 7/1997 | Easley | ..................................... 403/359 |
| 5,664,655 | 9/1997 | Oh . | |
| 5,674,026 | 10/1997 | Ishibashi et al. . | |
| 5,941,141 | 8/1999 | Whitley | .................................... 81/63.1 |

*Primary Examiner*—James G. Smith
*Assistant Examiner*—David B Thomas
*Attorney, Agent, or Firm*—Seyfarth, Shaw

[57] ABSTRACT

An interference fit joint is provided and includes a first member having a plurality of internal splines separated by valleys and defining a splined aperture having a first axis. Each of the internal splines has a crest and first and second internal sides and is symmetrical about a plane which includes the first axis. This joint also includes a second member having a second axis and an exterior surface having a plurality of external splines separated by valleys and engageable with the internal splines to form an interference fit therebetween. Each of the external splines has a crest and first and second external sides and is symmetrical about a plane which includes the second axis. The first and second external sides are respectively shaped differently from and engageable with first and second internal sides of adjacent internal splines, there being no engagement at the crests and valleys. An indexable head ratchet wrench employing the joint is also disclosed.

15 Claims, 7 Drawing Sheets

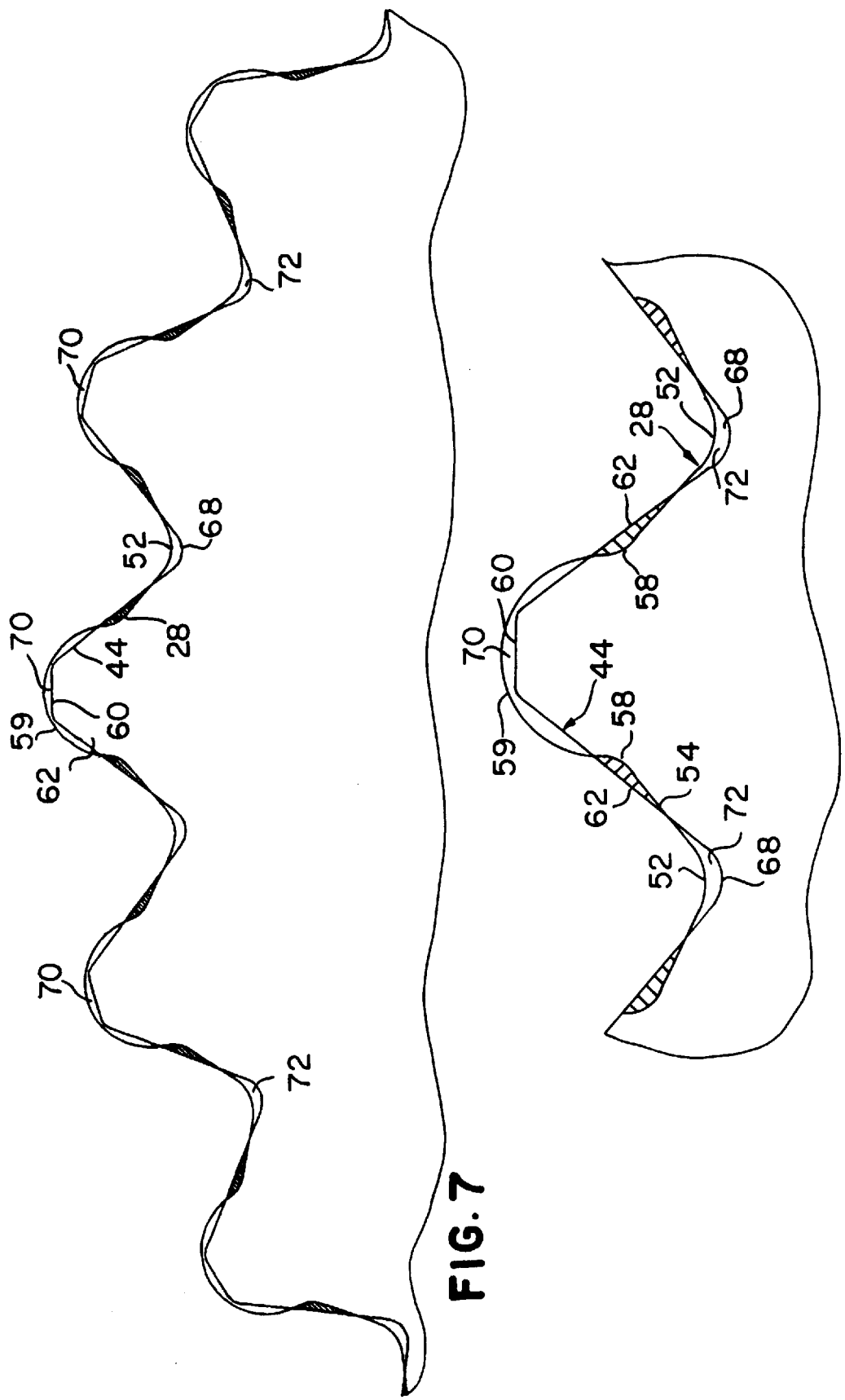

INTERFERENCE FIT JOINT AND METHOD AND INDEXABLE RATCHET WRENCH UTILIZING SAME

BACKGROUND OF THE INVENTION

1. Field of the Invention

This invention relates to interference fit joints and more particularly to tools containing such joints.

2. Description of the Prior Art

Interference fit joints on many tools, such as indexable ratchet wrenches, were previously formed by internal splines defining an aperture on an outer member, such as a ratchet head, and external splines on an inner member, such as an indexable pin. The internal and external splines were usually similarly shaped and each included a crest and side flats and was separated from adjacent splines on the member by valleys. Typically, when the first and second members were pressed together, they contacted each other at the crests, side flats, and valleys. Though this structure provided a good connection, the interference between the crests and valleys created hoop stress on the outer member and many times would cause cracking of the outer member. The tolerances of the external and internal splines would therefore need to be closely controlled during manufacture to aid in preventing cracking.

Some interference fit joints have been formed which do not have as much of a hoop stress problem. These joints are, however, either non-permanent, costly or subject to other problems.

For example, one such interference fit joint previously formed includes identically shaped internal and external splines engaging each other only on respective side flats. The splines are slid together and then the external splines are urged outward toward the internal splines by a threaded member to produce the interference fit between the flats of the splines. The structure forming the fit, however, is costly and does not form a permanent joint.

Another prior interference fit joint having reduced radial hoop stress includes internal splines and external splines where only one of the side flats of either the external splines or the internal splines has a slight helical angle which forms an interference fit with a facing flat of an engaged spline. This structure, however, cantilevers the splines and could cause fracture of the splines at the valleys between the splines.

SUMMARY OF THE INVENTION

It is a general object of the invention to provide an improved interference fit joint, while affording additional structural and operating advantages.

An important feature of the invention is the provision of an interference fit joint which is of relatively simple and economical construction.

A further feature of the invention is the provision of an interference fit joint of the type set forth, providing a good fit between its members while minimizing radial hoop stress and cracking of the joined members.

Another feature of the invention is the provision of an interference fit joint of the type set forth which allows greater dimensional tolerance of the individual splines forming the joint.

Another feature of the invention is the provision of a tool incorporating a joint of the type set forth.

Still another feature of the invention is the provision of a method of forming a joint of the type set forth.

One or more of these features may be attained by providing an interference fit joint including a first member having a plurality of internal splines defining a splined aperture having a first axis. Each of the internal splines has a crest and first and second internal sides and is symmetrical about a plane which includes the first axis. This joint also includes a second member having a second axis and an exterior surface having a plurality of external splines engageable with the internal splines to form a press fit therebetween. Each of the external splines has a crest and first and second external sides and is symmetrical about a plane which includes the second axis. The first and second external sides being respectively shaped differently from and engageable with first and second internal sides of adjacent internal splines.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 7 is a fragmentary schematic overlay of the peripheries of the interfering splines of the pin and the ratchet head of FIG. 2, showing in cross-hatching the areas of interference therebetween for forming the interference fit joint;

FIG. 8 is an enlarged view of a portion of FIG. 7; and

DETAILED DESCRIPTION OF THE PREFERRED EMBODIMENT

Figure 1:
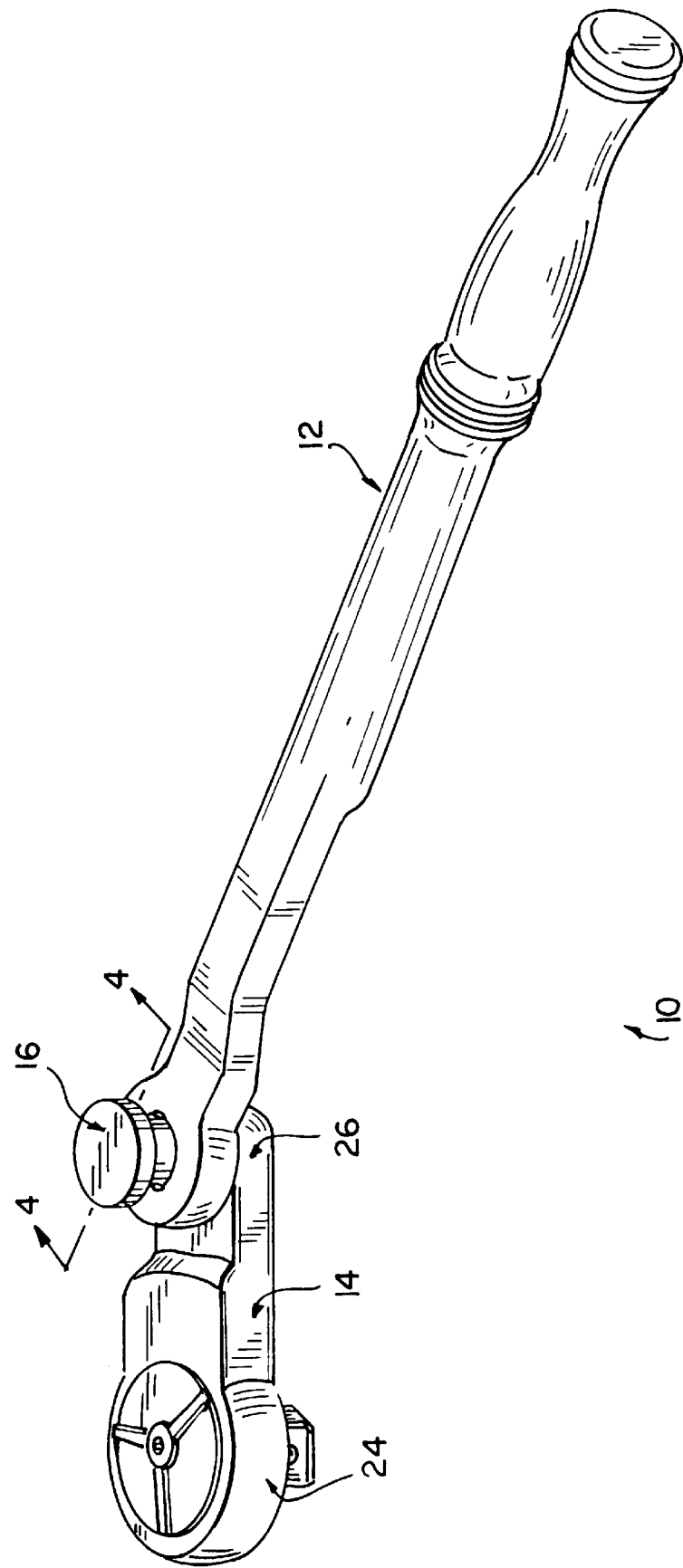
FIG. 1 is a perspective view of the indexable head ratchet wrench of the present invention.
Figure 2:
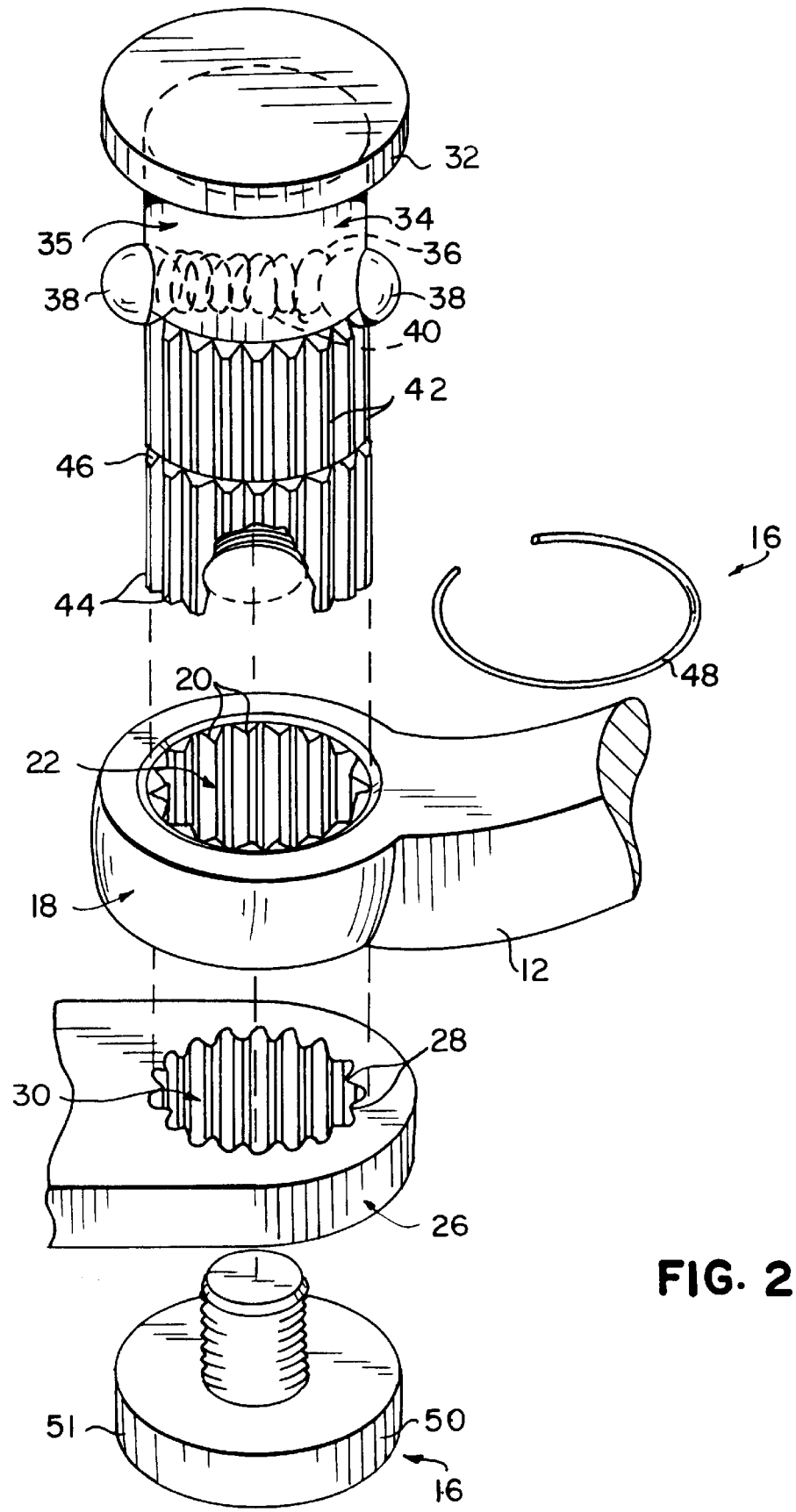
FIG. 2 is an enlarged, fragmentary, exploded, perspective view of the interference fit joint between the handle and ratchet head of the wrench of FIG. 1.
Figure 3:
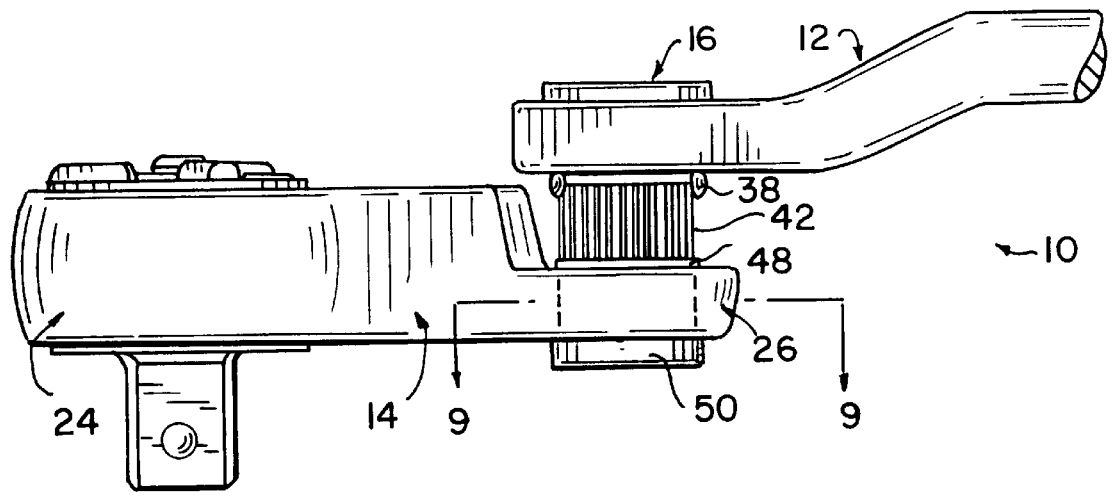
FIG. 3 is an enlarged, fragmentary, side elevation view of the ratchet wrench of FIG. 1.

Referring to FIG. 1, an indexable head ratchet wrench 10 is illustrated. The wrench 10 includes a handle 12, a ratchet head 14 and a splined pin assembly 16 indexably coupling the handle 12 to the ratchet head 14 in a known manner. As seen in FIG. 2, the handle 12 has a coupling end 18 having a plurality of handle splines 20 defining a splined aperture 22.

As seen in FIG. 1, the ratchet head 14 includes a ratcheting end 24 for housing a conventional ratchet mechanism and a connecting end 26. The connecting end 26 has a plurality of head splines 28 defining a splined aperture 30.

Figure 4:
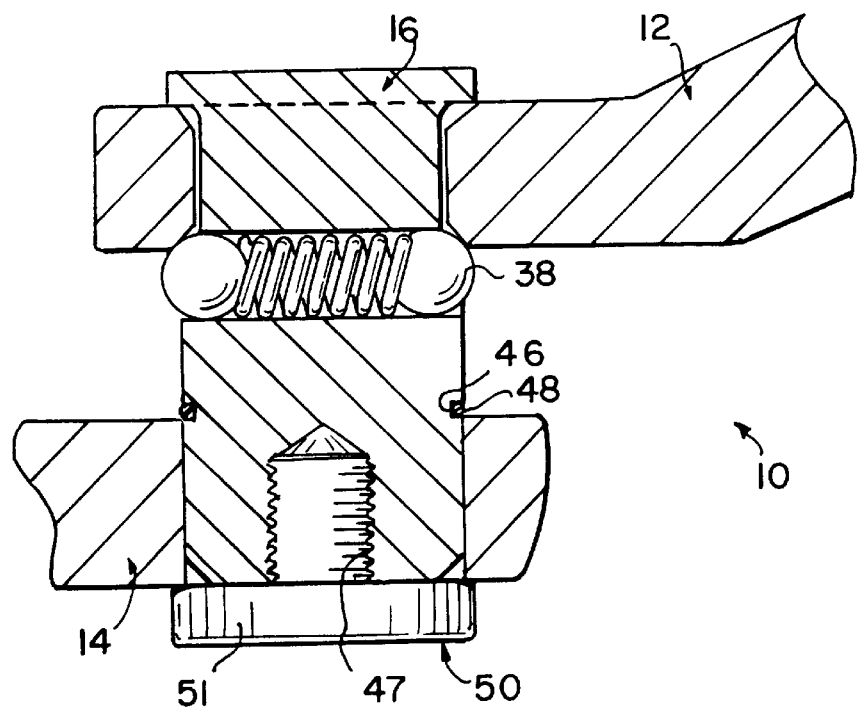
FIG. 4 is an enlarged, fragmentary, sectional view taken generally along line 4—4 of FIG. 1.

As seen in FIG. 2, the splined pin assembly 16 includes an upper end cap 32 integral with a cylindrical pin 34 having a bore 36 therethrough housing two balls 38 and a spring 40 therebetween. The cylindrical pin 34 has a plurality of external indexing splines 42 and a plurality of external connecting splines 44 therebelow. A groove 46 separates the two sets of splines 42, 44. The cylindrical pin 34 also has a threaded axial bore 47 (FIG. 4) at its lower end. As seen in FIGS. 2 and 4, a retaining ring 48 is disposed in the groove 46. The splined pin assembly 16 also has a screw 50 threaded in the threaded bore 47 and having a head 51 with a diameter greater than that of the pin 34.

As discussed further below, the connecting splines 44 are pressed into the head aperture 30 to form a permanent interference fit joint with the head splines 28. The geometries of the connecting splines 44 of the pin 34 and the head splines 28 allow a unique interference fit joint to be formed therebetween.

Figure 5:
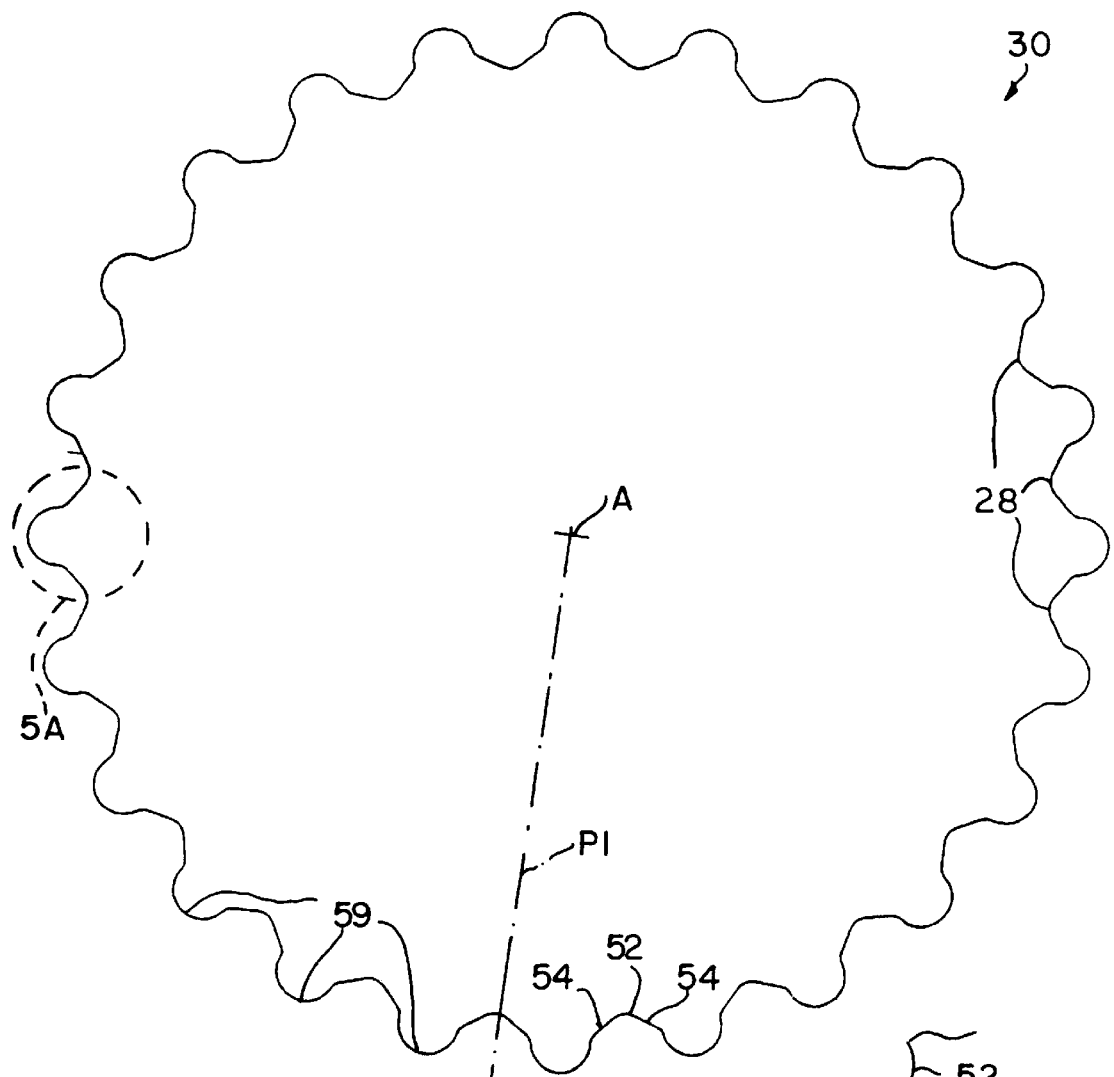
FIG. 5 is an enlarged, schematic, plan view of the periphery of the internal splines of the head of the ratchet wrench of FIG. 2.
Figure 5A:
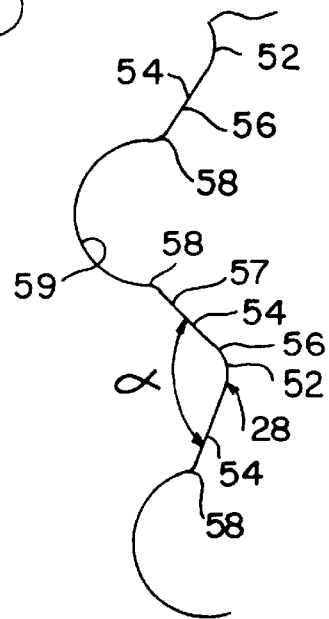
FIG. 5a is a further enlarged view of a portion of FIG. 5.

As seen in FIG. 5, there are twenty-four head splines 28 forming the splined aperture 30. The splined aperture 30 has an axis A at its center. Each head spline 28 is bilaterally symmetrical about a radial plane (e.g., P1) running through axis A and has a rounded crest 52 of a given radius. As seen in FIG. 5A, each spline 28 also has a pair of flat side portions 54, each having an upper end 56 connected to the crest 52 and a lower end 57 connected to a radiused portion 58 connected to a valley 59. As seen in FIG. 5A, the flat portions 54 of each head spline 28 form an angle α therebetween. Each valley 59 separates adjacent head splines 28. Each valley 59 is part-cylindrical and extends through an arc of approximately 180°.

Figure 6:
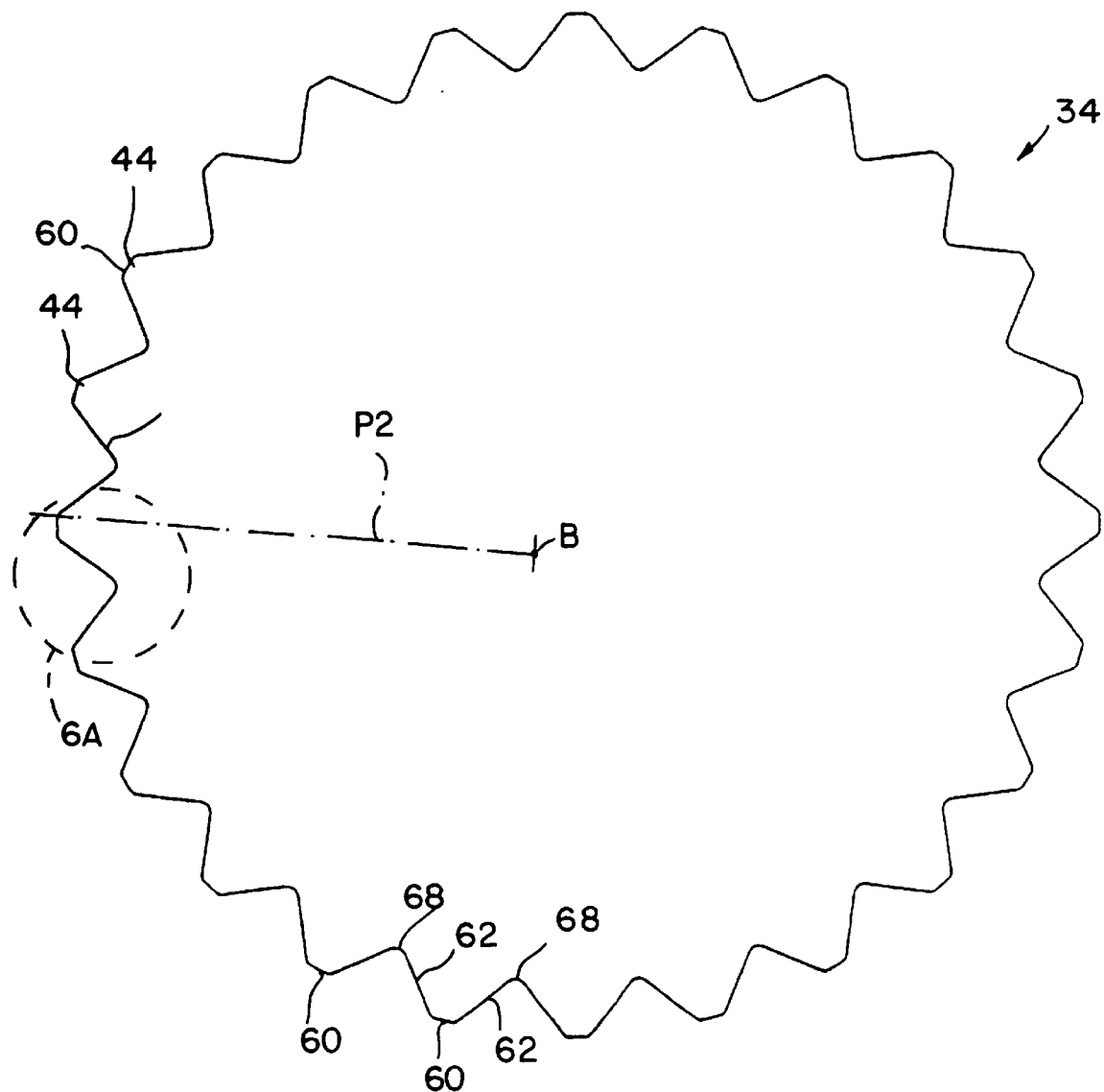
FIG. 6 is an enlarged, schematic, plan view of the periphery of the external splines of the pin of the ratchet wrench of FIG. 2.
Figure 6A:
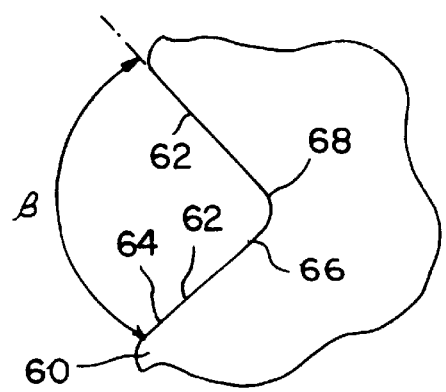
FIG. 6a is a further enlarged view of a portion of FIG. 6.

As seen in FIG. 6, the pin 34 has a central axis B and twenty-four connecting splines 44 about its outer surface and shaped differently than the head splines 28. Each spline 44 is bilaterally symmetrical about a radial plane (e.g., P2) running through axis B. Each spline 44 has a substantially flat or planar crest 60 and two flat side portions 62, each having an upper end 64 connected to the crest 60 and a lower end 66 connecting to a valley 68 (FIG. 6A). The flat portions 62 are longer than the flat portions 54 of the head splines 28. Each valley 68 separates opposing flat portions 62 of adjacent connecting splines 44. Each valley 62 is rounded and has a radius and linear extent respectively smaller than the radius and linear extent of each of the valleys 59 separating the head splines 28. As seen in FIG. 6A, the opposing flat portions 62 of adjacent connecting splines 44 form an angle β therebetween smaller than angle α.

Figure 9:
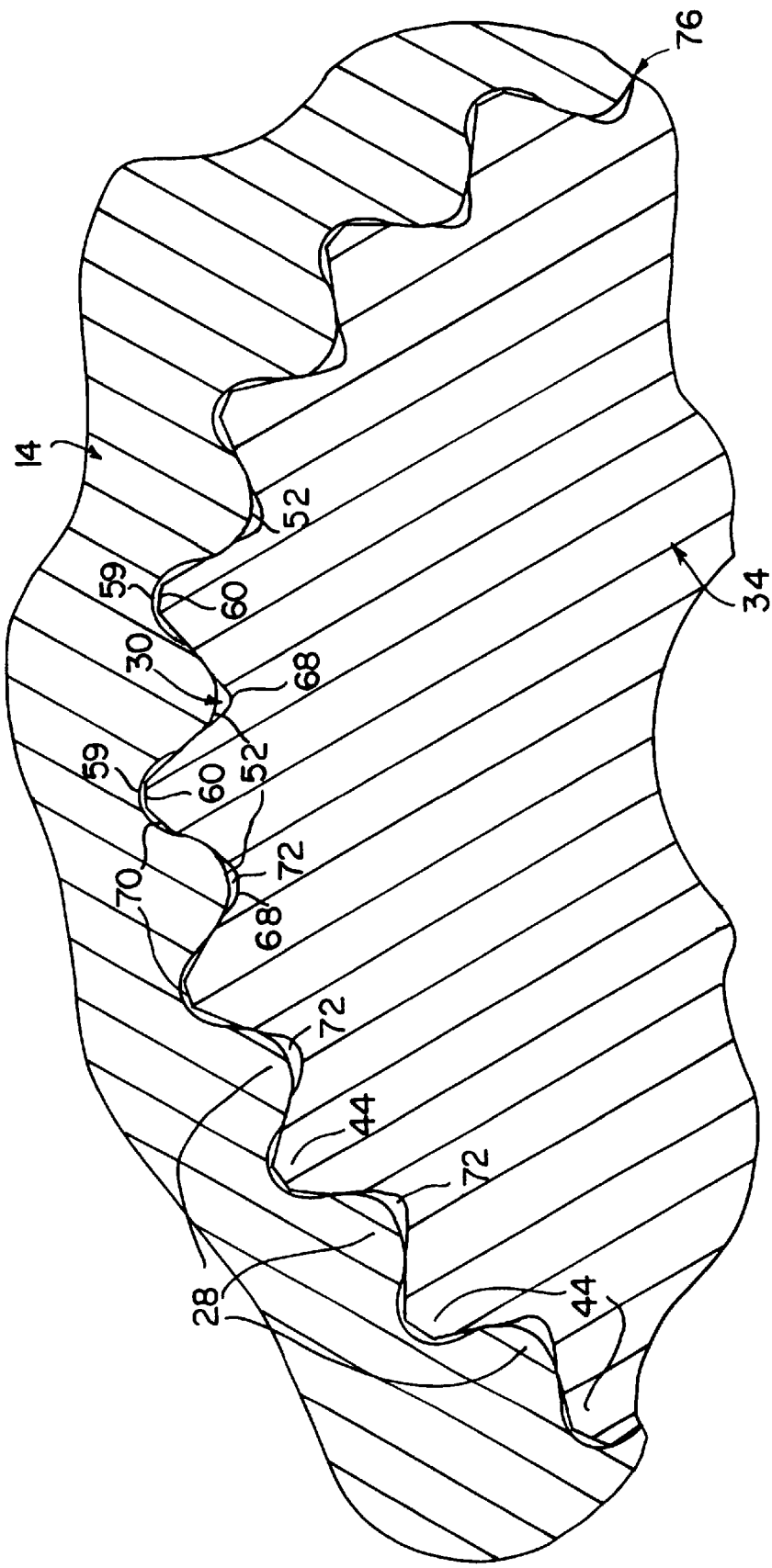
FIG. 9 is a partial sectional view taken generally along line 9—9 of FIG. 3.

The maximum distance between each crest 60 and the central axis B of the pin 34 is less than the maximum distance between the axis A of the splined aperture 30 of the head 14 and each head valley 59, whereby when ratchet head 14 and pin 34 are pressed together to form a permanent interference fit joint 76, as in FIGS. 1, 3, 4, and 9, and the two axes A, B are coaxial, as shown schematically in FIGS. 7 and 8 and as shown in the actual fit joint 76 of FIG. 9, none of the crests 60 of the connecting splines 44 contacts a valley 59 of the splined aperture 30 and gaps 70 are formed therebetween. Similarly, the distance between the crest 52 of each head spline 28 and the axis A of the splined aperture 30 is greater than the distance between each of the pin valleys 68 and the axis B of the pin 34 so that the crests 52 of the head splines 28 do not contact the valleys 68 between the connecting splines 44 and gaps 72 are formed therebetween. Thus, no hoop stress is created by contact between the respective crests 52, 60 and valleys 59, 68.

As seen in FIGS. 7 and 8, axes A and B are coaxial. Due to the lengths of the flat portions 54 and 62 and the angles α, β, the radiused portions 58 of the head splines 28 overlap the flat portions 62 of the connecting splines 44 to create an area of interference to form the interference fit joint 76 (FIG. 9) only along the sides of the splines 28, 44.

The ratchet wrench 10 is assembled as follows. First, the balls 38 and spring 40 are placed in the bore 36 of the pin 34 in a known manner. The splined aperture 22 of the handle 12 is then slid over the connecting and indexing splines 44, 42, and then slid further upward compressing the balls 38 and spring 40 within bore 36 to rest between the balls 38 and the cap 32. The retaining ring 48 is then placed in groove 46. The axis B of pin 34 is then coaxially aligned with the axis A of the splined aperture 30 of the ratchet head 14 with the spline crests 52 and 60 respectively aligned with the valleys 68 and 59. Then, the parts are axially pressed together by a press, such as, without limitation, a hydraulic press or a hand press made by Dake, a division of JSJ Corp., until the retaining ring 48 contacts the head splines 28, thereby creating the permanent interference fit joint 76 locking the pin 34 to the ratchet head 14. The screw 50 is then threaded into threaded bore 47. The handle 12 may be placed in multiple discrete positions relative to the head 14 by interleaving the handle splines 20 with the indexing splines 42 in a known manner.

As seen in FIG. 9, one or more of either or both of the connecting splines 44 and the head splines 28 in the interference fit joint 76 have been deformed. The deformation will vary depending upon the amount of overlap of the splines 28, 44, the tolerances in manufacture of the splines 28, 44, the axial alignment of the pin 34 and splined aperture 30 prior to and during pressing and other features.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An interference fit joint comprising:

a first member having a plurality of internal splines defining a splined aperture having a first axis, wherein each of the internal splines has a crest and first and second internal sides and is symmetrical about a plane which includes the first axis;

a second member having a second axis and an exterior surface having a plurality of external splines engageable with the internal splines to form a press fit therebetween wherein each of the external splines has a crest and first and second external sides and is symmetrical about a plane which includes the second axis, the first and second external sides being respectively shaped differently from and engageable with first and second internal sides of adjacent internal splines wherein the internal and external splines are respectively separated by internal and external valleys, the internal and external valleys being respectively spaced from the external and internal crests, each internal valley cooperating with its associated external crest to define a first space substantially devoid of material, each external valley cooperating with its associated internal crest to define a second space substantially devoid of material.

2. The joint of claim 1, wherein the adjacent internal and external splines are respectively separated by internal and external valleys respectively having internal and external center lines, and each of the first and second internal sides has first and second internal flat portions and each of the first and second external sides has first and second external flat portions, and wherein the first and second internal flat portions of an internal spline form an internal angle therebetween and the first and second external flat portions of an external spline form an external angle therebetween, wherein the internal angle is greater than the external angle.

3. The joint of claim 2, wherein the first and second internal flat portions respectively have first ends connected to the crest and second ends respectively terminating at first and second radiused portions, the first and second radiused portions respectively overlap the first and second external flat portions of adjacent external splines for forming an interference fit therebetween.

4. The joint of claim 3, wherein each of the internal valleys is substantially part-cylindrical and connects the first and second radiused portions of adjacent internal splines.

5. The joint of claim 2, wherein the first and second internal flat portions are respectively longer than the first and second external flat portions.

6. The joint of claim 1, wherein the crest of each external spline is substantially planar.

7. An indexable head ratchet wrench comprising:

a ratchet head;

a handle;

a first one of the head and the handle having a plurality of internal splines defining a splined aperture having a first axis, wherein each of the internal splines has a crest and first and second head sides and is symmetrical about a plane which includes the first axis; and a pin coupled to a second one of the head and the handle;

the pin having a second axis and an exterior surface having a plurality of external splines engaged with the internal splines to form a press fit therebetween, wherein each of the external splines has a crest and first and second external sides and is symmetrical about a plane which includes the second axis, the first and second external sides being respectively shaped differently from and engageable with first and second internal sides of adjacent internal splines, the internal and external splines define an interference fit joint wherein the internal and external splines are respectively separated by internal and external valleys, the internal and external valleys being respectively spaced from the external and internal crests, each internal valley cooperating with its associated external crest to define a first space substantially devoid of material, each external valley cooperating with its associated internal crest to define a second space substantially devoid of material.

8. The wrench of claim 7, wherein the handle has a plurality of splines defining an indexing splined aperture indexably coupled to the pin, whereby the handle can be releasably coupled to the head in a plurality of discrete positions.

9. The wrench of claim 7, wherein the adjacent internal and external splines are respectively separated by internal and external valleys respectively having internal and external center lines, and each of the first and second internal sides has first and second internal flat portions and each of the first and second external sides has first and second external flat portions, and wherein the first and second internal flat portions of an internal spline form an internal angle therebetween and the first and second external flat portions of an external spline form an external angle therebetween, wherein the internal angle is greater than the external angle.

10. The wrench of claim 9, wherein the first and second internal flat portions respectively have first ends connected to the crest and second ends respectively terminating at first and second radiused portions, the first and second radiused portions respectively overlap the first and second external flat portions of adjacent external splines for forming an interference fit therebetween.

11. The wrench of claim 10, wherein each of the internal valleys is substantially part-cylindrical and connects the first and second radiused portions of adjacent internal splines.

12. The wrench of claim 9, wherein the first and second internal flat portions are respectively longer than the first and second external flat portions.

13. The wrench of claim 7, wherein the crest of each external spline is substantially planar.

14. A method of forming an interference fit joint comprising:

providing a first member having a plurality of internal splines defining a splined aperture having a first axis, wherein each of the internal splines has a crest and first and second internal sides and is symmetrical about a plane which includes the first axis;

providing a second member having a second axis and an exterior surface having a plurality of external splines, wherein each of the external splines has a crest and first and second external sides and is symmetrical about a plane which includes the second axis, the first and second external sides being respectively shaped differently from the first and second internal sides of the internal splines; and axially pressing the second member into the aperture to create an interference fit between the first and second sides of the internal splines and the second and first sides of the external splines, wherein the adjacent internal and external splines are respectively separated by internal and external valleys, the internal and external valleys being respectively spaced from the external and internal crests, each internal valley cooperating with its associated external crest to define a first space substantially devoid of material, each external valley cooperating with its associated internal crest to define a second space substantially devoid of material, the members being pressed together substantially without contact of valleys by crests.

15. The method of claim 14, wherein at least one of the members is deformed by the pressing together.

* * * * *